United States Patent
Ishikawa et al.

(10) Patent No.: US 9,995,061 B2
(45) Date of Patent: Jun. 12, 2018

(54) SMART ENTRY SYSTEM

(71) Applicant: DENSO CORPORATION, Kariya, Aichi-pref. (JP)

(72) Inventors: Ryusuke Ishikawa, Kariya (JP); Nobuyoshi Nagai, Kariya (JP); Koji Ueno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/516,919

(22) PCT Filed: Oct. 13, 2015

(86) PCT No.: PCT/JP2015/005183
§ 371 (c)(1),
(2) Date: Apr. 5, 2017

(87) PCT Pub. No.: WO2016/063496
PCT Pub. Date: Apr. 28, 2016

(65) Prior Publication Data
US 2017/0292291 A1    Oct. 12, 2017

(30) Foreign Application Priority Data
Oct. 24, 2014   (JP) ................................ 2014-217566

(51) Int. Cl.
*G05B 19/00* (2006.01)
*E05B 49/00* (2006.01)
(Continued)

(52) U.S. Cl.
CPC .......... *E05B 49/008* (2013.01); *B60R 25/245* (2013.01); *E05B 81/78* (2013.01); *G07C 2009/00769* (2013.01); *H01Q 1/3283* (2013.01)

(58) Field of Classification Search
CPC .... G07C 9/00; G07C 9/00111; G07C 9/00174
(Continued)

(56) References Cited

U.S. PATENT DOCUMENTS 7,668,556 B2 * 2/2010 Yokoshi .............. H04M 1/6066
455/456.3
2004/0256452 A1 * 12/2004 Coughlin ................ G06F 21/35
235/380
(Continued)

FOREIGN PATENT DOCUMENTS

JP        S63145151 A    6/1988
JP        2000045591 A    2/2000
(Continued)

*Primary Examiner* — Carlos E Garcia
(74) *Attorney, Agent, or Firm* — Harness, Dickey & Pierce, P.L.C.

(57) ABSTRACT

A smart entry system that releases a lock of an opening/closing body includes: a transmission unit that transmits a call signal to a mobile key by wireless communication; a reception unit that receives a response signal from the mobile key responding to the call signal; and a control unit that outputs a call signal transmission command to the transmission unit, performs authentication of the response signal when the reception unit receives the response signal, and outputs a command for unlocking the opening/closing body based on a result of the authentication. The call signal is transmitted by a polling system. The control unit includes an output strength setting unit that changes and sets an output strength of the call signal.

12 Claims, 3 Drawing Sheets

(51) Int. Cl.
*B60R 25/24* (2013.01)
*E05B 81/78* (2014.01)
*G07C 9/00* (2006.01)
*H01Q 1/32* (2006.01)

(58) Field of Classification Search
USPC .......................................... 340/5.72, 539.21
See application file for complete search history.

(56) References Cited

U.S. PATENT DOCUMENTS

| | | | | |
|---|---|---|---|---|
| 2006/0176177 | A1* | 8/2006 | Heinze | G06K 17/00 340/572.1 |
| 2007/0162191 | A1* | 7/2007 | Matsubara | G07C 9/00309 701/1 |
| 2013/0324036 | A1* | 12/2013 | Hillan | H04W 8/005 455/41.1 |
| 2015/0161834 | A1* | 6/2015 | Spahl | G07C 9/00111 340/5.61 |
| 2017/0050618 | A1* | 2/2017 | Lickfelt | B60R 25/403 |
| 2017/0161974 | A1* | 6/2017 | Kim | G07C 9/00007 |

FOREIGN PATENT DOCUMENTS

| | | |
|---|---|---|
| JP | 2000054699 A | 2/2000 |
| JP | 2003 41823 A | 2/2003 |
| JP | 2005127050 A | 5/2005 |
| KR | 10199958580 A | 7/1999 |

\* cited by examiner

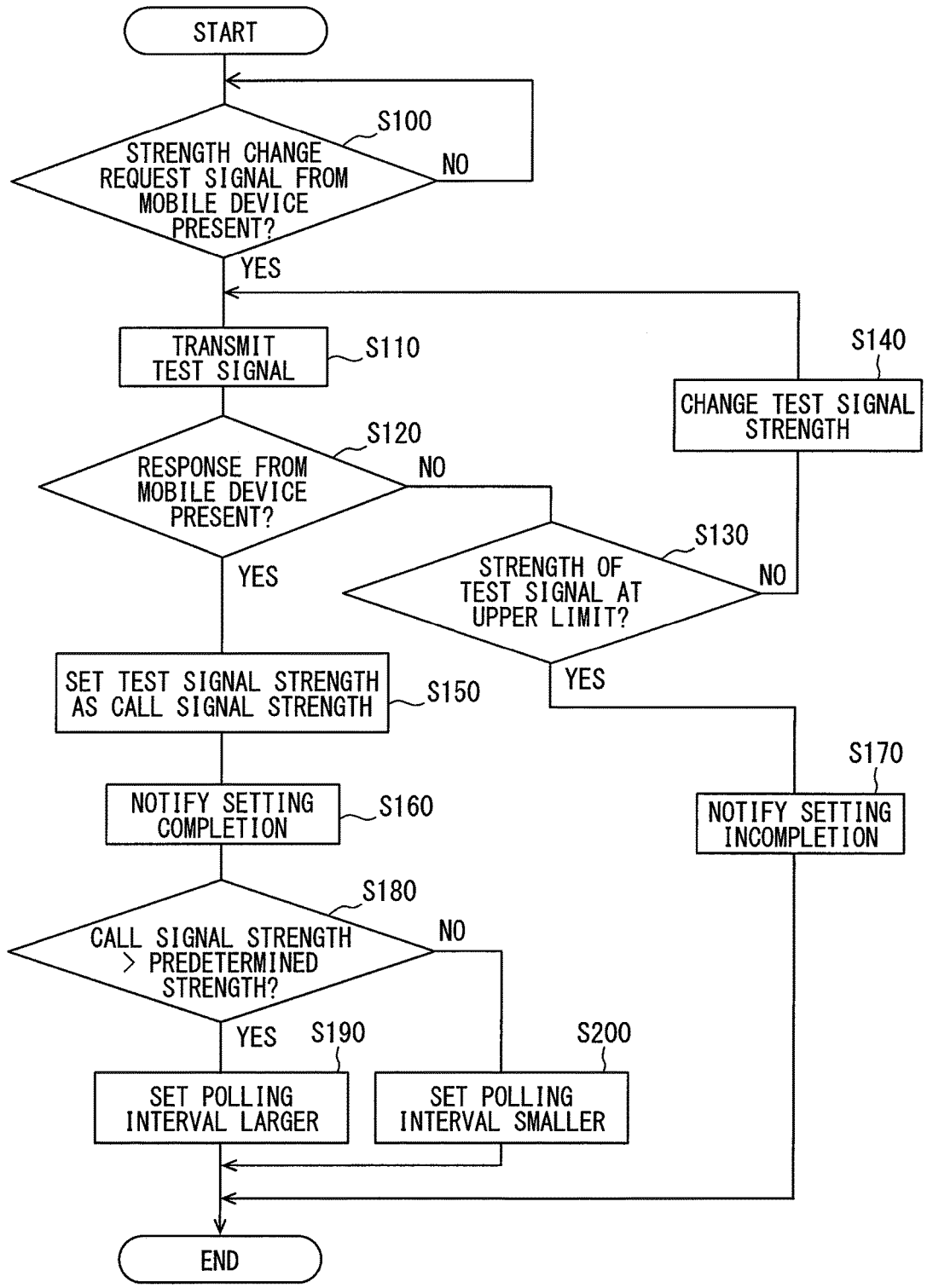

SMART ENTRY SYSTEM

CROSS REFERENCE TO RELATED APPLICATIONS

This application is a U.S. National Phase Application under 35 U.S.C. 371 of International Application No. PCT/JP2015/005183 filed on Oct. 13, 2015 and published in Japanese as WO 2016/063496 A1 on Apr. 28, 2016. This application is based on and claims the benefit of priority from Japanese Patent Application No. 2014-217566 filed on Oct. 24, 2014. The entire disclosures of all of the above applications are incorporated herein by reference.

TECHNICAL FIELD

The present disclosure relates to a smart entry system that releases a lock of an opening/closing body.

BACKGROUND ART

A smart entry system described in Patent Literature 1 for example is known as a conventional smart entry system. More specifically, the smart entry system in Patent Literature 1 includes a transmitter that transmits a call signal to a smart key by wireless communication, a receiver that receives a response signal from the smart key responding to the call signal, and an ECU that outputs a call signal transmission command to the transmitter, performs authentication of the response signal when the receiver receives the response signal, and outputs a command for unlocking a door based on an authentication result.

In the above smart entry system, in the case where the call signal from the transmitter is transmitted by a polling system, when a user approaches a vehicle at a predetermined distance, the smart key receives the call signal. Then, the response signal is transmitted from the smart key, and received by the receiver. When the response signal is authenticated by the ECU, the door is unlocked.

PRIOR ART LITERATURE

Patent Literature

Patent Literature 1: JP 2005-127050 A

SUMMARY OF INVENTION

However, the smart entry system in Patent Literature 1 does not describe the adjustment of the response distance (predetermined distance to the vehicle) of the smart key based on the call signal by the polling system. That is, normally, the response distance of the smart key is a preset fixed distance. Therefore, the user cannot intentionally change and adjust the response distance, and therefore cannot use the system under an operating condition according to the user's preference or usability.

It is an object of the present disclosure to provide a smart entry system that allows adjustment of the response distance of a smart key in the case of using the polling system.

According to an aspect of the present disclosure, a smart entry system that releases a lock of an opening/closing body includes: a transmission unit that transmits a call signal to a mobile key by wireless communication; a reception unit that receives a response signal from the mobile key responding to the call signal; and a control unit that outputs a call signal transmission command to the transmission unit, performs authentication of the response signal when the reception unit receives the response signal, and outputs a command for unlocking the opening/closing body based on a result of the authentication. The call signal is transmitted by a polling system. The control unit has an output strength setting unit that changes and sets an output strength of the call signal.

According to this configuration, the output strength setting unit can change the output strength of the call signal. As the output strength of the call signal is increased, the call signal can be transmitted farther from the transmission unit, so that the mobile key can respond to the call signal even at a position more distant from the transmission unit. Then, the control unit performs authentication of the response signal of the mobile key, and releases the lock. That is, it is possible to release the lock even if the mobile key is at the more distant position.

In contrast, as the output strength of the call signal is decreased, the reaching distance of the call signal transmitted from the transmission unit is shortened; accordingly, the mobile key responds to the call signal at a position nearer to the transmission unit. Then, the control unit performs authentication of the response signal of the mobile key, and releases the lock. That is, it is possible to release the lock if the mobile key is at the nearer position.

Thus, in the system in which the call signal is transmitted by the polling system, it is possible to change the setting of the distance between the transmission unit and the mobile key that can respond to the call signal.

BRIEF DESCRIPTION OF DRAWINGS

The above and other objects, features and advantages of the present disclosure will become more apparent from the following detailed description made with reference to the accompanying drawings, in which like parts are designated by like reference numbers and in which:

FIG. 3 is a flowchart showing control contents performed by the MPU according to a second embodiment.

DESCRIPTION OF EMBODIMENTS

Figure 1:
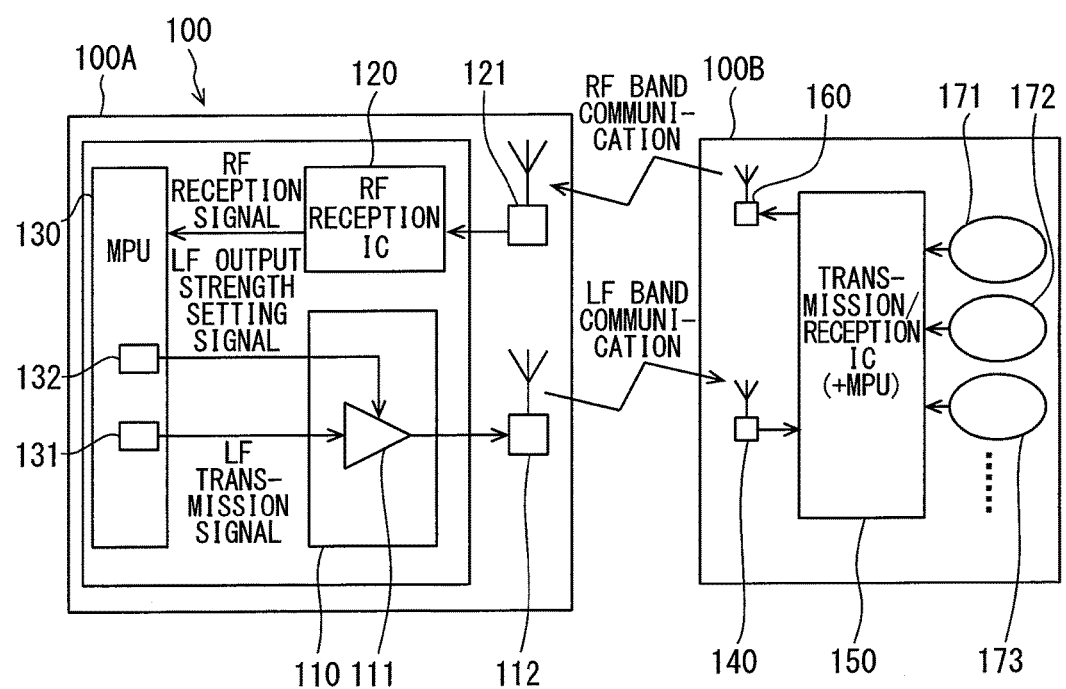
FIG. 1 is a block diagram showing the configuration of a smart entry system according to a first embodiment.

Hereinafter, a plurality of embodiments of the present disclosure will be described with reference to the drawings. In each embodiment, sections corresponding to items described in the preceding embodiment are denoted by the same reference numerals, and their repetitive description might be omitted. In each embodiment, in the case where only a part of a configuration is described, the precedingly described embodiment can be applied to the other part of the configuration. It is possible not only to combine parts that can be explicitly combined in the embodiments, but also to partially combine the embodiments even if not explicitly specified if there is no trouble with the combination.

(First Embodiment)

A smart entry system 100 according to a first embodiment will be described with reference to FIGS. 1 and 2. The smart entry system 100 according to the first embodiment is a system that enables the releasing of a lock of (the unlocking of) a vehicle door (opening/closing body) without directly inserting a key into the key cylinder of the vehicle door. Further, in the smart entry system 100, when a user gets out of the vehicle and touches a predetermined part (e.g., door knob) of the closed vehicle door, a trigger signal is generated so that the vehicle door is locked.

Further, the vehicle to which the smart entry system 100 is employed can have a welcome function for turning on, e.g., a light provided on a door mirror, a headlight, an interior light, or the like when the vehicle door is unlocked.

The smart entry system 100 includes a vehicle-side main body unit 100A and a mobile device 100B, as shown in FIG. 1.

The vehicle-side main body unit 100A is provided near the door knob of the vehicle, and includes an LF driver 110, an RF reception IC 120, an MPU 130, and the like.

The LF driver 110 is a transmission unit that transmits a call signal to the mobile device 100B outside the vehicle, by wireless communication, using an LF (Low Frequency) wave as a long wave. The call signal is transmitted by the polling system. The LF driver 110 has an amplifier 111 and an LF transmission antenna 112. According to the polling system, the call signal continues to be transmitted from the LF driver 110 periodically (at predetermined transmission intervals) without requiring a trigger from the outside.

The amplifier 111 is an amplification device that amplifies an LF transmission signal outputted from an LF transmission signal output unit 131 of the MPU 130 described later to a predetermined (fixed) magnitude or amplifies the LF transmission signal to an arbitrary magnitude based on an LF output strength setting signal outputted from an output strength setting unit 132 of the MPU 130 described later. The amplified LF transmission signal is the call signal.

The LF transmission antenna 112 is an antenna that transmits the call signal amplified by the amplifier 111 to the outside of the vehicle.

The call signal amplified to the fixed magnitude is a signal that reaches a predetermined distance range outside the vehicle from the LF transmission antenna 112. The predetermined distance range is, for example, a distance range of about 70 to 80 cm, and is fixed as an initial value. The call signal amplified to the arbitrary magnitude is enhanced in output strength, and is a signal that reaches an arbitrary distance range outside the vehicle from the LF transmission antenna 112. The arbitrary distance range is, for example, a distance range longer or shorter than the predetermined distance range.

The RF reception IC 120 is a reception unit that receives, through an RF reception antenna 121, a response signal using an RF (Radio Frequency) wave as a high frequency wave transmitted from the mobile device 100B. The RF reception IC 120 outputs the received response signal as an RF reception signal to the MPU 130 described later.

The MPU 130 is a control unit (Micro Processing Unit) that outputs a command of the LF transmission signal to the LF driver 110, performs authentication of the response signal (RF reception signal) when the RF reception IC 120 receives the response signal from the mobile device 100B, and outputs a command for unlocking the vehicle door based on the result of the authentication.

The MPU 130 has the LF transmission signal output unit 131 and the output strength setting unit 132. The LF transmission signal output unit 131 is an output unit that outputs the LF transmission signal as the call signal to the LF driver 110. The output strength setting unit 132 is a setting unit that outputs the LF output strength setting signal for changing and setting the output strength of the basic LF transmission signal (call signal) in response to a later-described strength change request signal from the user.

Meanwhile, the mobile device 100B is a mobile key carried by the user, and includes an LF reception antenna 140, a transmission/reception IC 150, an RF transmission antenna 160, a lock button 171, an unlock button 172, a trunk button 173, and the like.

The LF reception antenna 140 is an antenna that receives the call signal transmitted from the LF transmission antenna 112 and outputs the call signal to the transmission/reception IC 150 described later.

The transmission/reception IC 150 is an IC unit that outputs the response signal required for authentication to the RF transmission antenna 160, based on the call signal inputted from the LF reception antenna 140. Further, upon receiving an input signal associated with the pressing operation of any of the lock button 171, the unlock button 172, and the trunk button 173, the transmission/reception IC 150 outputs a request signal corresponding to the input signal to the MPU 130 (details will be described later).

The RF transmission antenna 160 is an antenna that transmits the response signal or the request signal from the transmission/reception IC 150 to the RF reception antenna 121.

The lock button 171 is an input unit that performs input for locking the vehicle door regardless of the call signal when the lock button 171 is pressed by the user. More specifically, the lock button 171 generates a door lock request signal requesting the locking of the vehicle door, and outputs the door lock request signal to the transmission/reception IC 150. The door lock request signal is transmitted from the transmission/reception IC 150 to the MPU 130.

The unlock button 172 is an input unit that performs input for unlocking the vehicle door regardless of the call signal when the unlock button 172 is pressed by the user, as with the lock button 171. More specifically, the unlock button 172 generates a door unlock request signal requesting the unlocking of the vehicle door, and outputs the door unlock request signal to the transmission/reception IC 150. The door unlock request signal is transmitted from the transmission/reception IC 150 to the MPU 130.

The trunk button 173 is an input unit that performs input for unlocking the vehicle trunk regardless of the call signal when the trunk button 173 is pressed by the user, as with the lock button 171. More specifically, the trunk button 173 generates a trunk unlock request signal requesting the unlocking of the vehicle trunk, and outputs the trunk unlock request signal to the transmission/reception IC 150. The trunk unlock request signal is transmitted from the transmission/reception IC 150 to the MPU 130.

Basically, one of the buttons 171 to 173 is selected and pressed in accordance with each request described above. However, besides that, in the present embodiment, when the buttons 171 to 173 are operated in a procedure different from a primarily used pressing operation, a strength change request signal for changing the output strength of the LF transmission signal (call signal) is generated and outputted to the transmission/reception IC 150. The strength change request signal is transmitted from the transmission/reception IC 150 to the MPU 130. In this context, the primarily used pressing operation is, for example, a pressing operation in which any one is selected and pressed in accordance with each request, and is also called a predetermined pressing operation.

The procedure different from the primarily used pressing operation can be, for example, a case where any two or more of the three buttons 171 to 173 are pressed at the same time, or a case where any two or more of the three buttons 171 to 173 are pressed in order.

The operation of the smart entry system 100 configured as above will be described with reference to a flowchart in FIG. 2.

In the smart entry system 100, the LF transmission signal is outputted from the LF transmission signal output unit 131, amplified to the fixed magnitude by the amplifier 111, and transmitted as the call signal from the LF transmission antenna 112 to the outside of the vehicle. The call signal is transmitted by the polling system.

When, in a state where the vehicle door is locked, the user carrying the mobile device 100B approaches the vehicle and comes within the predetermined distance range, that is, the reaching distance of the call signal to the mobile device 100B, the LF reception antenna 140 of the mobile device 100B receives and outputs the call signal to the transmission/reception IC 150. The transmission/reception IC 150 outputs the response signal including ID information for authentication to the RF transmission antenna 160. The response signal is transmitted from the RF transmission antenna 160 to the RF reception antenna 121.

The RF reception IC 120 receives the response signal from the RF reception antenna 121, and outputs the response signal as the RF reception signal to the MPU 130. When the MPU 130 receives the RF reception signal, the MPU 130 performs authentication of the RF reception signal (response signal) with information for authentication concerning the mobile device 100B retained by the MPU 130. If the authentication is established, the MPU 130 releases the lock of (unlocks) the vehicle door.

In the above operation, the reaching distance of the call signal transmitted from the LF transmission antenna 112 to the mobile device 100B is basically fixed to the predetermined distance. However, in the present embodiment, it is possible to change and set the reaching distance of the call signal to the mobile device 100B, in accordance with the user's preference or usability. The reaching distance of the call signal to the mobile device 100B corresponds to the distance between the mobile device 100B responding to the call signal and the LF driver 110.

In order to change the reaching distance of the call signal, first the user stands at a desired distance (e.g., about 5 m) from the vehicle door, and presses the buttons 171 to 173 of the mobile device 100B simultaneously or sequentially, so that the strength change request signal is outputted to the transmission/reception IC 150. The strength change request signal is received by the RF reception IC 120 through the RF reception antenna 121 from the RF transmission antenna 160, and inputted to the MPU 130.

Figure 2:
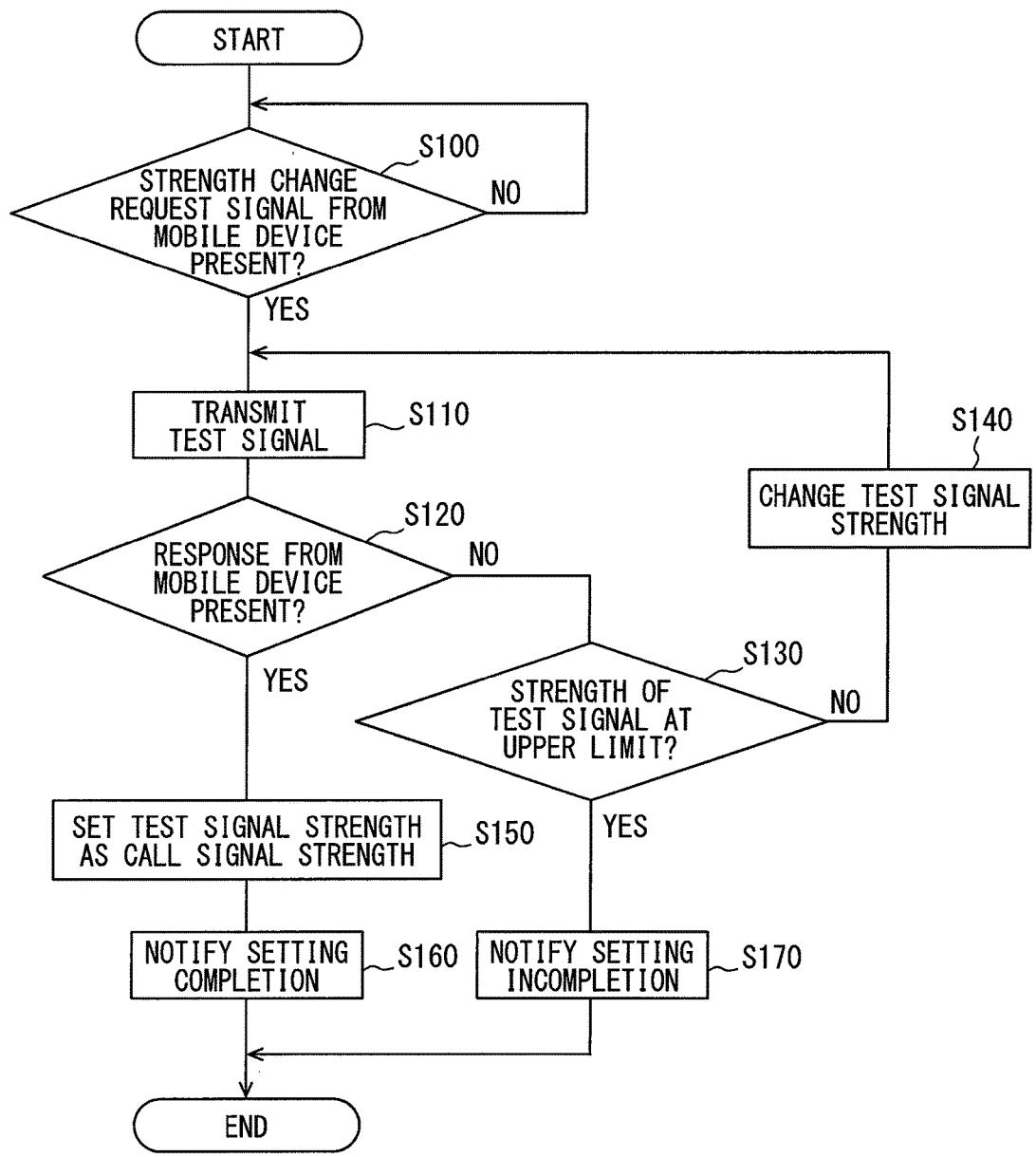
FIG. 2 is a flowchart showing control contents performed by an MPU according to the first embodiment.

In S100 shown in FIG. 2, the MPU 130 monitors whether or not the strength change request signal from the mobile device 100B is present. If Yes in S100, that is, if the MPU 130 determines that the strength change request signal is present, the flow proceeds to S110. If No, S100 is repeated.

In S110, the MPU 130 transmits a test signal. The test signal is generated as follows. That is, the MPU 130 causes the output strength setting unit 132 to output the LF output strength setting signal, and first generates a signal obtained by increasing the output strength of the call signal by a predetermined amount with respect to the output strength (initial value) of the call signal having the predetermined reaching distance. This is the first test signal. This test signal is the call signal obtained by increasing the output strength by the predetermined amount. The MPU 130 transmits the test signal from the LF transmission antenna 112 to the mobile device 100B.

In S120, the MPU 130 determines whether or not response signal from the mobile device 100B based on the test signal is present. That is, if the test signal obtained by increasing the output strength by the predetermined amount does not reach the mobile device 100B (No in S120), the test signal is not the call signal that corresponds to the distance desired by the user.

In this case, in S130, the MPU 130 determines whether or not the test signal that has just been transmitted reaches the upper limit of the settable output strength. If No, in S140 the output strength of the test signal is updated so as to be further increased by the predetermined amount. Then, S110 and S120 are performed in the same way as above.

Thus, by repeating S110 to S140, the output strength of the test signal is increased in sequence. If Yes in S120, it can be grasped that the output strength of the test signal at this time enables the test signal, i.e., the call signal to reach the distance desired by the user.

Therefore, if Yes in S120, in S150 the MPU 130 sets the output strength of the test signal at this time to be the output strength of a new call signal. That is, at the amplifier 111, the amplification degree of the LF transmission signal is changed and set. By repeating S110 to S140 as above, the output strength of the call signal is set larger as the reaching distance of the call signal is set longer. In contrast, the output strength of the call signal is set smaller as the reaching distance of the call signal is set shorter.

In S160 after S150, the MPU 130 notifies the user that the change setting of the reaching distance of the call signal, that is, the change setting of the output strength has been completed. For the notification, e.g., a buzzer or the like provided in the engine room of the vehicle is sounded one time (e.g., a beep is emitted).

On the other hand, during the repetition of S110 to S140, if the MPU 130 determines in S130 that the test signal reaches the upper limit of the settable output strength, the output strength of the call signal cannot be increased any more, and the distance desired by the user cannot be attained. That is, the change setting of the output strength results in a failure.

In this case, in S170, the MPU 130 notifies the user that the change setting of the reaching distance of the call signal has not been completed. For the notification, e.g., the buzzer or the like is sounded multiple times (e.g., two beeps are emitted).

If the user changes and sets the reaching distance of the call signal to the desired distance as described above, and then further changes the reaching distance to a different desired distance; when the test signal is transmitted in S110, the initial value is set to the output strength of the first test signal, and the output strength is increased in sequence by the predetermined amount.

Thus, in the present embodiment, the output strength setting unit 132 can change the output strength of the call signal. As the output strength of the call signal is increased, the call signal can be transmitted more farther from the LF driver 110, so that the mobile device 100B can respond to the call signal even at a position more distant from the LF driver 110. Then, the MPU 130 authenticates the response signal of the mobile device 100B, and releases the lock. That is, it is possible to release the lock even if the mobile device 100B is at the more distant position.

On the other hand, as the output strength of the call signal is decreased, the reaching distance of the call signal transmitted from the LF driver 110 is shortened; accordingly, the mobile device 100B responds to the call signal at a position nearer to the LF driver 110. Then, the MPU 130 authenticates the response signal of the mobile device 100B, and releases the lock. That is, it is possible to release the lock if the mobile device 100B is at the nearer position.

Thus, in the system in which the call signal is transmitted by the polling system, it is possible to change the setting of the reaching distance of the call signal to the mobile device 100B in accordance with the user's preference or usability.

Further, when the output strength of the call signal is changed and set, the buttons 171 to 173 provided on the mobile device 100B are used. When the buttons 171 to 173 are pressed in the procedure different from the primarily used pressing operation, the strength change request signal is outputted, which enables easy setting without requiring a special input unit.

Further, in changing and setting the output strength of the call signal, the MPU 130 notifies the user of completion if the change setting completes, and notifies the user of incompletion if the change setting fails, so that the user can surely recognize whether or not the desired distance setting has been made.

By changing the reaching distance of the call signal from the predetermined initial distance (about 70 to 80 cm) to a certain desired distance (e.g., about 5 m) and also having the welcome function of a light or the like in the vehicle, the user can obtain sufficient benefit from a welcome response. Further, at night, since the light is turned on by the welcome response, it becomes easier for the user to recognize the position relation with the vehicle.

Further, in the case where the reaching distance of the call signal is short such as the predetermined initial distance (about 70 to 80 cm); since the response signal is generated in response to the call signal and then authenticated for unlocking, it takes time until unlocking, and the user might think that the response of the unlocking system is poor. However, by changing and setting the reaching distance of the call signal; before the user comes close to the vehicle, the authentication is completed and the door is unlocked, so that the door can be opened immediately.

(Second Embodiment)

FIG. 3 shows a second embodiment. In the second embodiment, while the basic configuration of the smart entry system 100 is the same as in the first embodiment, the changing of the transmission interval of the call signal transmission based on the polling system in accordance with the output strength of the call signal is added to the control performed by the MPU 130.

A flowchart shown in FIG. 3 is obtained by adding S180 to S200 to the flowchart illustrated in FIG. 2.

After the setting completion notification in S160, in S180 the MPU 130 determines whether or not the output strength of the changed and set call signal is larger than a predetermined strength. If Yes in S180, in S190 the MPU 130 (output strength setting unit 132) sets the transmission interval of the call signal based on the polling system to be larger than a transmission interval in the case of the predetermined strength.

If No in S180, in S200 the MPU 130 sets the transmission interval of the call signal based on the polling system to be smaller than the transmission interval in the case of the predetermined strength.

That is, in S190 and S200, the control unit 130 increases the transmission interval as the output strength of the call signal is larger, and decreases the transmission interval as the output strength of the call signal is smaller.

The call signal based on the polling system continues to be transmitted at the predetermined transmission intervals while the vehicle is parked, that is, the vehicle is not in use. Therefore, as the output strength of the call signal is larger, a working current in the smart entry system 100 becomes larger proportionally. The working current in this case is a so-called dark current, and as the dark current is larger, a reduction in the charge amount of a vehicle battery becomes larger.

For this reason, by increasing the transmission interval as the output strength of the call signal is larger, it is possible to suppress the occurrence of the dark current. In contrast, by decreasing the transmission interval as the output strength of the call signal is smaller, it is possible to continue the transmission of the call signal while suppressing an increase in the dark current.

What is claimed is:

1. A smart entry system that releases a lock of an opening/closing body, the smart entry system comprising:
   a transmission unit that transmits a call signal to a mobile key by wireless communication;
   a reception unit that receives a response signal from the mobile key responding to the call signal; and
   a control unit that outputs a call signal transmission command to the transmission unit, performs authentication of the response signal when the reception unit receives the response signal, and outputs a command for unlocking the opening/closing body based on a result of the authentication, wherein
   the call signal is transmitted by a polling system,
   the control unit includes an output strength setting unit that changes and sets an output strength of the call signal,
   the mobile key has a plurality of input units that perform input for unlocking or locking the opening/closing body by a pressing operation of a user,
   the mobile key is configured to output a strength change request signal when the plurality of input units are pressed in a procedure different from a primarily used pressing operation,
   when the output strength setting unit receives the strength change request signal, the output strength setting unit determines a distance between the transmission unit and the mobile key of a time of receiving the strength change request signal as a user's intended distance, and
   the output strength setting unit changes and sets the output strength of the call signal according to the user's intended distance.

2. The smart entry system according to claim 1, wherein the output strength setting unit increases the output strength of the call signal as the user's intended distance between the mobile key responding to the call signal transmitted by the polling system and the transmission unit is longer.

3. The smart entry system according to claim 1, wherein the output strength setting unit decreases the output strength of the call signal as the user's intended distance between the mobile key responding to the call signal transmitted by the polling system and the transmission unit is shorter.

4. The smart entry system according to claim 1, wherein the procedure different from the primarily used pressing operation is a case where the plurality of input units are pressed at the same time.

5. The smart entry system according to claim 1, wherein the procedure different from the primarily used pressing operation is a case where the plurality of input units are pressed in a predetermined order.

6. The smart entry system according to claim 1, wherein the control unit sets a transmission interval of the call signal based on the polling system in accordance with the output strength of the call signal.

7. The smart entry system according to claim 6, wherein the control unit increases the transmission interval as the output strength of the call signal is larger.

8. The smart entry system according to claim 6, wherein the control unit decreases the transmission interval as the output strength of the call signal is smaller.

9. The smart entry system according to claim 1, wherein the control unit notifies the user of completion of changing and setting of the output strength of the call signal by the output strength setting unit when the output strength setting unit completes the changing and setting of the output strength of the call signal, and notifies the user of incompletion of the changing and setting of the output strength of the call signal when the output strength setting unit fails the changing and setting of the output strength of the call signal.

10. The smart entry system according to claim 1, wherein the output strength setting unit outputs a test signal toward the mobile key, when receiving the strength change request signal, to determine the user's intended distance, the output strength setting unit increases an output strength of the test signal by a predetermined amount and repeats outputting of the test signal the output strength of which is increased by the predetermined amount until the output strength setting unit receives a response signal responding to the test signal from the mobile key, and the output strength setting unit sets the output strength of the test signal of a time receiving the response signal responding to the test signal from the mobile key as the output strength of the call signal.

11. The smart entry system according to claim 10, wherein the opening/closing body is a door of a vehicle, the plurality of input units include a lock button to lock the lock of the door, an unlock button to unlock the door, and a trunk button to unlock a trunk of the vehicle.

12. The smart entry system according to claim 1, wherein the opening/closing body is a door of a vehicle, the plurality of input units include a lock button to lock the lock of the door, an unlock button to unlock the door, and a trunk button to unlock a trunk of the vehicle.

\* \* \* \* \*